(12) United States Patent
Liebhart

(10) Patent No.: US 8,254,872 B2
(45) Date of Patent: Aug. 28, 2012

(54) SIMPLIFIED METHOD FOR IMS REGISTRATION IN THE EVENT OF EMERGENCY CALLS

(75) Inventor: Rainer Liebhart, München (DE)

(73) Assignee: Nokia Siemens Networks GmbH & Co., Munich (DE)

(*) Notice: Subject to any disclaimer, the term of this patent is extended or adjusted under 35 U.S.C. 154(b) by 679 days.

(21) Appl. No.: 12/226,738

(22) PCT Filed: Apr. 13, 2007

(86) PCT No.: PCT/EP2007/053654
§ 371 (c)(1),
(2), (4) Date: Oct. 27, 2008

(87) PCT Pub. No.: WO2007/125024
PCT Pub. Date: Nov. 8, 2007

(65) Prior Publication Data
US 2009/0098851 A1 Apr. 16, 2009

(30) Foreign Application Priority Data
Apr. 27, 2006 (DE) .......................... 10 2006 019 719

(51) Int. Cl.
*H04M 11/04* (2006.01)
(52) U.S. Cl. ................ 455/404.1; 455/432.1; 455/435.1; 370/352; 379/37; 379/45
(58) Field of Classification Search .................. 455/403, 455/404.1, 404.2, 432.1, 433, 435.1, 435.2, 455/435.3, 436–444, 445, 466, 521, 550.1, 455/552.1, 556.1, 556.2, 557, 558, 560, 561; 370/310, 328, 331, 338, 351, 352, 401
See application file for complete search history.

(56) References Cited

U.S. PATENT DOCUMENTS

| | | | |
|---|---|---|---|
| 7,116,967 B2 * | 10/2006 | Kauppinen et al. ........ | 455/404.1 |
| 7,274,933 B2 * | 9/2007 | Zinn et al. .................. | 455/435.2 |
| 7,606,556 B2 * | 10/2009 | Poikselka et al. .......... | 455/404.2 |
| 2007/0060097 A1 * | 3/2007 | Edge et al. ................. | 455/404.1 |
| 2008/0008157 A1 * | 1/2008 | Edge et al. ..................... | 370/351 |

(Continued)

FOREIGN PATENT DOCUMENTS
EP 1 188 325 B1 3/2002
(Continued)

OTHER PUBLICATIONS

ETSI TS 123 167 v7.4.0 (Mar. 2007); Universal Mobile Telecommunications System (UMTS) IP Multimedia Subsystem (IMS) emergency sessions (3GPP TS 23.167 vesion 7.4.0 Release 7).*

(Continued)

*Primary Examiner* — Anthony Addy
(74) *Attorney, Agent, or Firm* — Squire, Sanders (US) LLP

(57) ABSTRACT

Simplification of IMS registration in the event of emergency calls is made possible by apparatuses and a method for setting up an emergency-call connection from a terminal to an IMS via a network visited by the terminal, where, if the terminal is already registered in the IMS, setup of an emergency-call connection dispenses with IMS registration of the terminal in the IMS for this emergency-call connection if a comparison between a network identification for the visited network, of which the terminal was notified when it registered in the visited network, and a network identification for the terminal's home network reveals a match between these network identifications.

21 Claims, 1 Drawing Sheet

U.S. PATENT DOCUMENTS

2008/0089486 A1* 4/2008 Madour et al. .................. 379/45
2008/0310599 A1* 12/2008 Purnadi et al. .................. 379/37

FOREIGN PATENT DOCUMENTS

| EP | 1 238 514 B1 | 4/2006 |
| EP | 1 650 997 A1 | 4/2006 |
| RU | 2 150 790 C1 | 6/2000 |
| WO | WO 03/094563 | 11/2003 |
| WO | 2005/055629 A1 | 6/2005 |

OTHER PUBLICATIONS

3GPP: "IM multimedia call control protocol based on session initiation protocol (SIP) and session Description protocol (SDP); stage 3, (Release 7) section 5.2.10", Technical Specification Group Core Network and terminals, Mar. 2006.

3GPP: "IP multimedia subsystem (IMS) emergency sessions (Release 7)", Technical Sepcification Group Services and System Aspects, Mar. 2006.

3GPP TS 24.229 V7.3.0, 3rd Generation Partnership Project; Technical Specification Group Core Network and Terminals; IP multimedia call control protocol based on Session Initiation Protocol (SIP) and Session Description Protocol (SDP); Stage 3 (Release 7), Mar. 2003, pp. 1-6.

Russian Office Action application No. 2008146757/08(061110) dated Feb. 25, 2011.

* cited by examiner

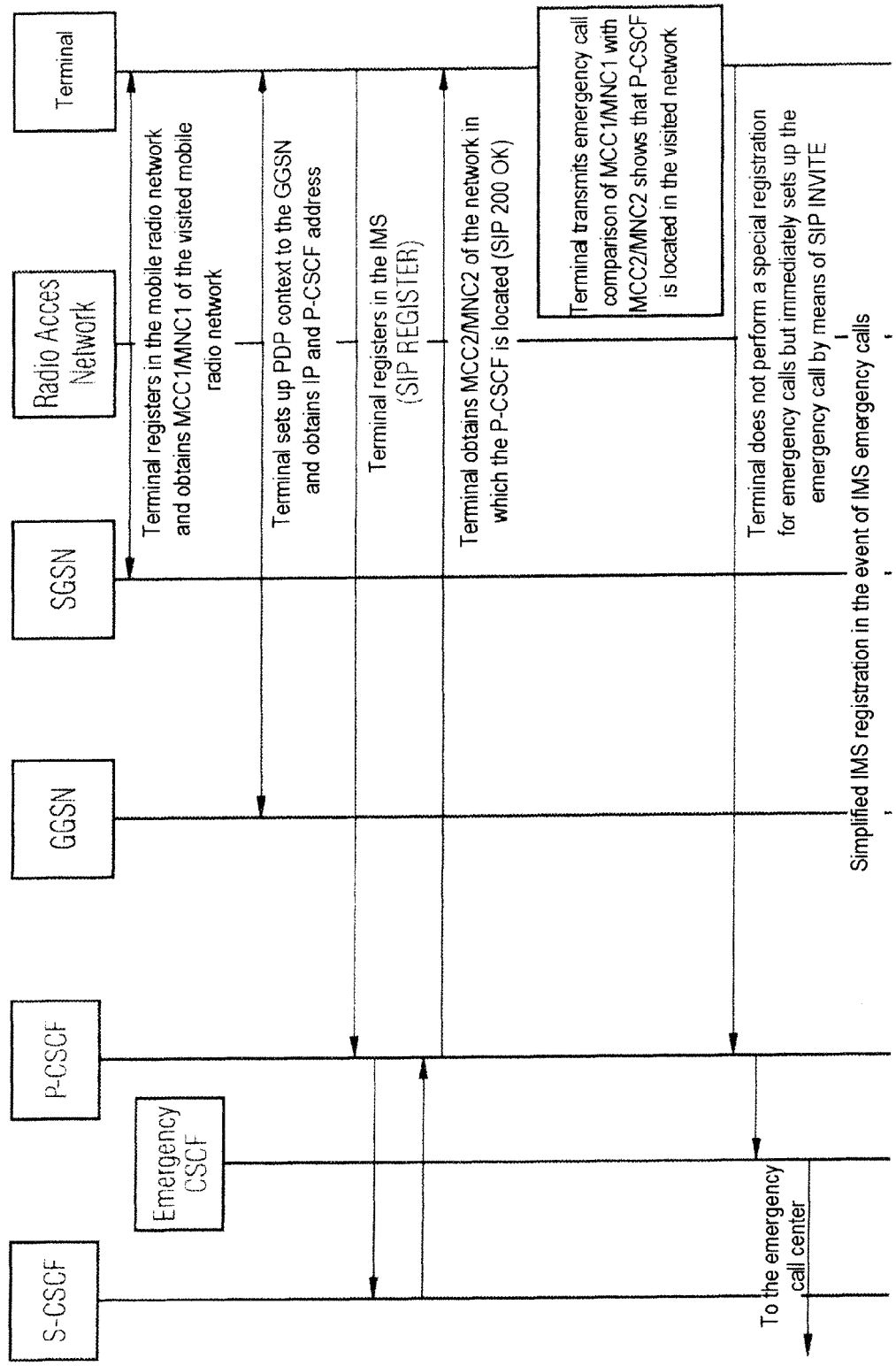

SIMPLIFIED METHOD FOR IMS REGISTRATION IN THE EVENT OF EMERGENCY CALLS

FIELD

The invention relates to methods and devices for IMS registration in the event of emergency calls.

BACKGROUND

Networks such as, e.g. cellular mobile radio networks, are known per se to the expert from, e.g. specifications in www.etsi.org or www.3gppp.org.

TS 23.167 Release 7 of the 3GPP Standardization Organization specifies emergency calls in the IMS (IP Multimedia Subsystem).

This 3GPP Technical Specification TS 23.167 also relates to Next Generation Fixed Networks as standardized, e.g. in ETSI TISPAN and CableLabs. An important basic principle for IMS emergency calls is the special "IMS emergency call registration". TS 23.167 is currently based on the fact that a terminal which wishes to transmit an emergency call in the IMS first registers in the IMS by means of an emergency call SIP URI (also called emergency call Public User Identity). This SIP URI (Session Initiation Protocol Uniform Resource Identifier) is either preconfigured in the terminal or the terminal generates it from an existing SIP URI which is stored, e.g. on the UICC (Universal Integrated Circuit Card), if present. In the case of GPRS/UMTS, the registration in the IMS is preceded by the setting-up of an emergency PDP (Packet Data Protocol) context. A PDP context sets up a session between the terminal and a GGSN and allocates an IP and a P-CSCF address to the terminal. This PDP context uses its own APN (Access Point Name), with the aid of which a GGSN and a P-CSCF (Proxy Call Session Control Function) are determined in the visited mobile radio network (VPLMN). This is necessary, since the emergency call must be routed in the VPLMN to the emergency call center, but in the case of roaming, the GGSN, and thus also the P-CSCF, may well be located in the home network of the subscriber (and usually are since the APNs are preconfigured in the terminal by the home network operator). However, this procedure has the disadvantage that the setting-up of a PDP context and the subsequent IMS registration can consume a great amount of time (easily within the range of seconds). For this reason, the 3GPP is currently considering how the special IMS registration can be dispensed with in the case of emergency calls if the terminal is already registered in the IMS. The situation is made more difficult by the fact that a terminal can register in a foreign network but P-CSCF and GGSN can still be located in the home network (so-called GPRS roaming, in contrast to IMS roaming, where P-CSCF and GGSN are both in the visited network).

SUMMARY

The invention describes possible methods of how a special IMS registration can be dispensed with in the case of emergency calls in order to thus significantly accelerate the setting up of the call. In the case of GPRS/UMTS networks, this also makes it possible to dispense with the setting up of an emergency call PDP context.

The current TS 23.167 Standard specifies that the terminal must always perform a registration in the IMS by means of the special emergency SIP URI.

In the case of GPRS/UMTS, this IMS registration is preceded by the setting-up of a special PDP context in the visited network by means of the special emergency APN.

The object of the invention is simplification of the setting-up of an emergency call connection.

The object is achieved in each case by the subject matters of the patent claims.

DETAILED DESCRIPTION

The invention describes methods of how the special IMS emergency call registration, and in the case of GPRS/UMTS, the setting-up of a special PDP context, can be dispensed with. In this context, it is assumed that the terminal has locally stored an identifier (network identifier) which identifies its home network (e.g. that of its mobile radio subscriber identification card). In mobile networks, this identifier is stored as MCC/MNC (Mobile Country Code/Mobile Network Code) of the home network on the SIM/USIM card.

If the terminal, when registering in the visited network, is informed by the latter about the network identifier of the visited network (in the case of GPRS/UMTS, this information is broadcasted, e.g. by the radio network, in 3GPP WLAN, this information is transmitted to the terminal during the access authentication, in Next Generation Fixed Networks, a similar method could be used as in the case of 3GPP WLAN), it can dispense with the special IMS registration for emergency calls if the terminal is already registered in the IMS and the comparison between the stored identifier of the home network and the received identifier of the visited network has revealed that both networks are identical, that is to say the terminal is not moving in a foreign network. Since the subscribers are predominantly located in their home network and the terminal must always be registered in the IMS in order to be "always on", and thus reachable, this method dispenses in most cases with a special IMS registration for emergency calls with the associated setting-up of a PDP context in the case of GPRS/UMTS.

According to one embodiment of the general method, the invention proposes that the P-CSCF sends the identifier of the network, in which it is located itself, to the terminal in the response to the registration request of the terminal (SIP 200 OK as response to the SIP REGISTER message). If, as previously described, the terminal determines that it is located in a visited network and not in the home network, it can determine, by means of the information which it has obtained from the P-CSCF during the registration, whether the P-CSCF is also located in the visited network. If this is the case, a special IMS registration for emergency calls is no longer necessary. In the case of emergency calls, the terminal can immediately set up the SIP session by means of an SIP INVITE message. In all other cases, emergency call registration is required. This alternative method also covers the scenarios in which the method described before is applicable, but is more generally applicable.

If not every P-CSCF is capable of dealing with emergency calls, the P-CSCF can send back related information also in the response to the registration request from this terminal. The terminal must then take this information into consideration in the decision whether it must perform a special emergency call registration or not.

The invention describes methods by means of which a special IMS registration for emergency calls, and in the case of GPRS/UMTS access systems, the setting-up of a separate PDP context, can be dispensed with in most cases. Since setting-up of a PDP context and IMS registration are timeconsuming procedures, this results in considerable time saving which is a significant requirement particularly in the case of emergency calls.

In particular, the invention can be used in cellular mobile radio networks but also in WLAN/WIMAX networks and fixed networks.

Further features and advantages of the invention are obtained from the further patent claims and the subsequent description of an exemplary embodiment by means of the drawing. The exemplary embodiment shows in FIG. 1 a flowchart which represents how a terminal, after successful IMS registration, can transmit an emergency call via a mobile radio access network without first having to perform a special emergency call registration in the IMS.

FIG. 1 shows some components "S-CSCF", "P-CSCF", "GGSN", "SGSN", "Radio Access Network" of a mobile radio network known per se to the expert from, e.g. specifications in www.etsi.org or www.3gppp.org.

A terminal (FIG. 1, "terminal") registers in a mobile radio network and obtains a network identifier ("MCC1/MNC1") of the mobile radio network visited by it.

The terminal then sets up a PDP context to a GGSN of the mobile radio network and is assigned an IP address and a P-CSCF address for the communication with the P-CSCF.

Following this, the terminal registers with the P-CSCF in the IMS (with a "SIP REGISTER" message). From the P-CSCF, the terminal obtains the network identifier "MCC2/MNC2" of the network in which this P-CSCF is located (with a "SIP 200 OK" message).

If the terminal should transmit an emergency call later, this is possible, e.g. in the following way:
a comparison of the network identifier "MCC1/MNC1" (stored in the terminal after its registration/authentication etc. in the mobile radio network visited by it) of the network visited by the terminal with the network identifier "MCC2/MNC2" of the network in which the P-CSCF is located, reveals that the P-CSCF is located in the network visited by the terminal.

For this reason, the terminal does not perform a special (separate/further) registration for the emergency call desired by it but immediately sets up the emergency call by means of a "SIP INVITE" message. This saves time.

The invention claimed is:

1. A method, comprising:
receiving, at a terminal, a network identifier of a visited network, the network identifier of the visited network notified to the terminal when the terminal is registered in the visited network;
comparing the received network identifier of the visited network with a network identifier of a home network of the terminal; and
setting up an emergency call connection, wherein an IP multimedia subsystem registration of the terminal in an IP multimedia subsystem for the emergency call connection is dispensed with when the terminal is already registered in the IP multimedia subsystem and the comparing reveals a match between the network identifiers.

2. The method as claimed in claim 1, wherein a match between the network identifiers specifies that the terminal or a mobile radio subscriber identity module located therein is located in its home network.

3. The method as claimed in claim 1, further comprising, when the comparison reveals a match of the network identifiers, transmitting the emergency call via an IP multimedia subsystem registration which already exists.

4. The method as claimed in claim 1, wherein the comparison is made in the terminal.

5. The method as claimed in claim 1, wherein the network identifier comprises at least one of a mobile country code and a mobile network code.

6. The method as claimed in claim 1, wherein the network is one of a cellular mobile radio network, a wireless local area network, a WIMAX network and a fixed network.

7. The method as claimed in claim 1, wherein the network identifier of the visited mobile radio network is conveyed to the terminal during the authentication of the terminal to the visited mobile radio network.

8. The method as claimed in claim 1, wherein a proxy call state control function of a mobile radio network sends the network identifier of the network, in which the proxy call state control function is located itself, to the terminal in a response to an IP multimedia subsystem registration request of the terminal, whereupon the terminal, when it recognizes that the visited network is not the home network, determines by a network identifier obtained from the proxy call state control function during the registration, whether the proxy call state control function is also located in the mobile radio network visited by the terminal, in which case, when the emergency call connection is set up, a special IP multimedia subsystem registration of the terminal in the IP multimedia subsystem is dispensed with for the emergency call connection and the terminal sets up a session initiation protocol session for the emergency call connection, whereas otherwise, when the emergency call connection is set up, the special IP multimedia subsystem registration of the terminal in the IP multimedia subsystem is first effected for the emergency call connection before the session initiation protocol session is set up for the emergency call connection.

9. The method as claimed in claim 1, wherein for the emergency call connection, the session initiation protocol session is set up by an "SIP INVITE" message.

10. The method as claimed in claim 1, wherein, if the proxy call state control function is not capable of dealing with emergency calls, the proxy call state control function sends back related information to the terminal in a response to a registration request by this terminal, and the terminal then takes the related information into consideration in the decision of whether it must perform a special emergency call registration or not.

11. The method as claimed in claim 1, wherein if the network comprises one of a general packet radio service and a universal mobile telecommunications system access system, setting-up of a separate packet data protocol context can be dispensed together with the IP multimedia subsystem registration of the terminal in the IP multimedia subsystem for the emergency call connection.

12. A terminal, comprising:
receiving means for receiving a network identifier of a visited network notified to the terminal when the terminal is registered in the visited network;
comparison means for comparing the received network identifier of the visited network with a network identifier of a home network of the terminal; and
connection means for setting-up the emergency call connection, wherein an IP multimedia subsystem registration of the terminal in the IP multimedia subsystem for the emergency call connection is dispensed with when the terminal is already registered in the IP multimedia subsystem and the comparison means reveals a match between the network identifiers.

13. A terminal, comprising:
a receiver configured to receive a network identifier of a visited network notified to the terminal when the terminal is registered in the visited network;

a comparator configured to compare the received network identifier of the visited network with a network identifier of a home network of the terminal; and a connection unit configured to set up an emergency call connection wherein an IP multimedia subsystem registration of the terminal in an IP multimedia subsystem for the emergency call connection is dispensed with when the terminal is already registered in the IP multimedia subsystem and the comparator reveals a match between the network identifiers.

14. A terminal according to claim 13, wherein the connection unit is configured to set up the emergency connection over an already existing IP multimedia subsystem registration if the comparator reveals a match between the network identifiers.

15. A terminal according to claim 13, wherein the network identifier of the visited network is received during an authentication of the terminal with the visited network.

16. A terminal according to claim 13, further comprising:
a subscriber identify module card configured to store the identifier of the home network of the device.

17. A terminal according to claim 13, wherein the receiver is configured to receive a network identifier which comprises at least one of a mobile country code and a mobile network code.

18. A terminal according to claim 13, wherein the receiver is configured to receive a network identifier from the visited network, wherein the visited network comprises one of a cellular network, a wireless local area network, a WIMAX network, and a fixed network.

19. A terminal according to claim 13, wherein the network comprises one of a general packet radio service and a universal mobile telecommunications system access system and where setting-up of a separate packet data protocol context can be dispensed with together with the IP multimedia subsystem registration of the terminal in the IP multimedia subsystem for the emergency call connection.

20. A terminal according to claim 13, wherein the network identifier is received from a proxy call state control function of a mobile radio network in a response to an IP multimedia subsystem registration request of the terminal identifying the network in which the proxy call state control function is located, said terminal further comprising:
a determiner configured to determine, when the visited network is not the home network, by the network identifier obtained from the proxy call state control function during the registration whether the proxy call state control function is also located in the mobile radio network visited by the terminal, in which case, when the emergency call connection is set-up, a special IP multimedia subsystem registration of the terminal in the IP multimedia subsystem is dispensed with for the emergency call connection and the terminal sets up a session initiation protocol session for the emergency call connection,
whereas otherwise, when the emergency call connection is set-up, the special IP multimedia subsystem registration of the terminal in the IP multimedia subsystem is first effected for the emergency call connection before the session initiation protocol session is set up for the emergency call connection.

21. A terminal according to claim 20, further comprising:
a decision unit configured to decide if a special emergency call registration is needed or not, after receiving information from the proxy call state control function that the proxy call state control function is not able to handle the emergency call.

\* \* \* \* \*

UNITED STATES PATENT AND TRADEMARK OFFICE
CERTIFICATE OF CORRECTION

| | |
|---|---|
| PATENT NO. | : 8,254,872 B2 |
| APPLICATION NO. | : 12/226738 |
| DATED | : August 28, 2012 |
| INVENTOR(S) | : Rainer Liebhart |

It is certified that error appears in the above-identified patent and that said Letters Patent is hereby corrected as shown below:

In the Claims:

Col. 4, Claim 9, Line 32
please change "in claim 1" to -- in claim 8 --

Col. 4, Claim 10, Line 35
please change "in claim 1" to -- in claim 8 --

Signed and Sealed this
First Day of July, 2014

Michelle K. Lee
*Deputy Director of the United States Patent and Trademark Office*